United States Patent
Fernandez

Patent Number: 5,941,935
Date of Patent: Aug. 24, 1999

[54] AZIMUTH-AXIS DRIFT RATE DETERMINATION IN AN INERTIAL NAVIGATOR

[76] Inventor: Manuel Fernandez, 3422 Laurie Pl., Studio City, Calif. 91604

[21] Appl. No.: 08/717,858

[22] Filed: Sep. 23, 1996

[51] Int. Cl.[6] .................................................. G06F 165/00
[52] U.S. Cl. ...................... 701/220; 701/221; 701/226; 701/300
[58] Field of Search .................... 701/220, 221, 701/200, 226, 207, 224, 300; 73/178 R

[56] References Cited

U.S. PATENT DOCUMENTS

| | | | |
|---|---|---|---|
| 5,410,487 | 4/1995 | Okayama et al. | 701/220 |
| 5,590,044 | 12/1996 | Buckreub | 701/220 |
| 5,640,325 | 6/1997 | Banbrook et al. | 701/220 |

*Primary Examiner*—William A. Cuchlinski, Jr.
*Assistant Examiner*—Gertrude Arthur
*Attorney, Agent, or Firm*—Lyon & Lyon LLP

[57] ABSTRACT

A process and algorithms to determine and correct for azimuth-axis drift rate in an inertial navigator. The process and algorithms may be implemented as an automatic sequence within the system computer to determine and correct the system errors thus determined. These actions provide the system with improved directional accuracy and improved navigation performance.

19 Claims, 6 Drawing Sheets

AZIMUTH-AXIS DRIFT RATE DETERMINATION IN AN INERTIAL NAVIGATOR

BACKGROUND OF THE INVENTION

1. Field of the Invention

This invention relates in general to inertial navigators and in particular wherein it is desired to determine and correct for azimuth-axis drift rate. The correction for azimuth-axis drift rate provides improved directional accuracy and improved navigational performance.

2. The Description of the Prior Art

It is well known by those skilled in the art that determination of azimuth-axis drift rate is illusive, because, on a short-time basis, the manifestations of such a possible error source in inertial navigators are small and not readily observable among the larger manifestations of other possible error sources.

The prior art has attempted to utilize external navigation aids (such as the Global Positioning System, GPS) and an optimal estimation filter to correct the system during flight. We use the phrase "correct the system" to denote the alignment and initialization of the system, and the calibration (correction) of the system error sources.

However, this technique suffers from the fact that the system model of the filter does not allow the azimuth-axis drift rate to be observable in the presence of other error sources in the system within the relatively short-time system updates produced by the filter.

An added complication is that the longitudinal (azimuth) axis of an inertial navigator is coupled to the lateral (North and East) axes thru the Foucault (24-hour) pendulum effect which is typically not included in the system model of the filter.

SUMMARY OF THE INVENTION

An object of this invention is to provide a means to determine and correct for azimuth-axis drift rate in an inertial navigator.

The system, after alignment and initialization, or correction, is complete, is placed in the (unaided) navigate mode and the system "North" Velocity error, $\Delta V_{NS}$, and/or the system Latitude error, $\Delta Lt$, are monitored at the end of the first complete Shuler (84-minute) period.

The azimuth-axis drift rate, $\Delta DR_{GD}$, is derived as follows:

$$\Delta DR_{GD} = \frac{\Delta V_{NS}}{(\Omega - \dot{L}g)\cos Lt R_{EO} T_S}$$

Or, $$\Delta DR_{GD} = \frac{2\Delta Lt}{(\Omega - \dot{L}g)\cos Lt R_{EO} T_S^2}$$

Where $$\dot{L}g = \text{Longitude Rate} = -\frac{V_E}{R_{EO}\cos Lt}$$

$V_E$=East Velocity
$\Omega$=Earth's angular rate in inertial space
Lt=Latitude of the system location $$T_S = \text{Shuler Period} = 84 \text{ minutes} = 2\pi\sqrt{\frac{R_{EO}}{G}}$$

$R_{EO}$=The distance from the center of the Earth to the system.

The above algorithms for $\Delta DR_{GD}$ are simplifications of the more general algorithms for time equal to one complete Shuler period, $t=T_S$.

Since the present invention is effective for time, t, equal to a time different from $T_S$, the more general algorithms below are useful:

$$\Delta DR_{GD} = \frac{\Delta V_{NS}}{(\Omega - \dot{L}g)\cos Lt R_{EO}\left(t - \sqrt{\frac{R_{EO}}{G}}\sin\sqrt{\frac{G}{R_{EO}}}t\right)}$$

Or, $$\Delta DR_{GD} = \frac{\Delta Lt}{(\Omega - \dot{L}g)\cos Lt R_{EO}\left(t^2/2 - \frac{R_{EO}}{G} + \frac{R_{EO}}{G}\cos\sqrt{\frac{G}{R_{EO}}}t\right)}$$

Where G=Gravity(approximately 32.2 feet/second$^2$).

The azimuth-axis drift rate has been denoted as $\Delta DR_{GD}$ to signify that it is the "Down" Gyro Drift Rate that is to be corrected.

To correct the system completely, the following corrections (all caused by the $\Delta DR_{GD}$ error) need to be made (besides the correction for $\Delta DR_{GD}$):

$\Delta\Psi = \Delta DR_{GD} T_S$ $\Delta\phi = 0$ (at $t=T_S$)

$\Delta V_{NS} = \Delta DR_{GD}(\Omega - \dot{L}_g)\cos Lt\, R_{EO}\, T_S$, or monitored $\Delta Lt = \frac{1}{2}\Delta DR_{GD}(\Omega - \dot{L}_g)\cos Lt\, R_{EO}\, T_S$, or monitored.

Time is measured with t=0 coincident with the time the system is switched to the (unaided) navigate mode. A positive $\Delta DR_{GD}$ error causes a positive $\Delta\Psi$ error, this positive $\Delta\Psi$ error causes a negative $\Delta\phi$ error and this negative $\Delta\phi$ error causes positive $\Delta V_{NS}$ and $\Delta Lt$ errors. Therefore, positive $\Delta V_{NS}$ and $\Delta Lt$ errors require a negative $\Delta DR_{GD}$ correction to the "Down" system gyro.

$\Delta\Psi$ is the azimuth-axis angular error caused by $\Delta DR_{GD}$.

$\Delta\phi$ is the "North" Level-axis angular error with respect to the horizontal caused by $\Delta DR_{GD}$.

The above algorithms are simplifications of the more general algorithms for time, t, equal to one complete Shuler period, $T_S$. The more general algorithms are as follows:

$$\Delta\psi = \Delta DR_{GD} t$$

$$\Delta\phi = -\Delta DR_{GD}(\Omega - \dot{L}g)\cos Lt \frac{R_{EO}}{G}\left(1 - \cos\sqrt{\frac{G}{R_{EO}}}t\right)$$

$$\Delta V_{NS} = \Delta DR_{GD}(\Omega - \dot{L}g)\cos Lt R_{EO}\left(t - \sqrt{\frac{R_{EO}}{G}}\sin\sqrt{\frac{G}{R_{EO}}}t\right)$$

-continued $$\Delta Lt = \Delta DR_{GD}(\Omega - \dot{L}g)\cos Lt R_{EO}\left[t^2/2 - \frac{R_{EO}}{G} + \frac{R_{EO}}{G}\cos\sqrt{\frac{G}{R_{EO}}}\,t\right]$$

The above algorithms have been derived assuming the quantity $(\Omega-\dot{L}_g) \cos Lt\, R_{EO}$ is a constant.

With the above corrections made to the system, the system can continue to navigate accurately, since it is now devoid of the azimuth-axis drift rate error and the system errors caused by this azimuth-axis drift rate acting over time.

The above process and algorithms overcome the shortcomings of prior techniques that are inadequate in achieving the determination and correction of the azimuth-axis drift rate. The present invention was discovered in the course of contemplating the exact error equations of the system and the possible error sources in the system that render the prior art ineffective in determining and correcting for azimuth-axis drift rate. It was during this investigation that the present invention was discovered. As it turned out, the desired result was achieved with a simple process and simple algorithms embodied in the present invention. The process and algorithms of the present invention may be implemented as an automatic sequence within the system computer to correct the system.

Ⓐ is the $\Delta V_{NS}$ error caused by an "East" Gyro Drift Rate, $\Delta DR_{GE}$, of 0.001 degrees/hour (illustrative example).

Ⓑ is the $\Delta Lt$ error caused by an "East" Gyro Drift Rate, $\Delta DR_{GE}$, of 0.001 degrees/hour (illustrative example). Note that $\Delta DR_{GE}$ is one of the other possible error sources in the system, other than $\Delta DR_{GD}$.

Ⓒ is the $\Delta\Psi$ error caused by a "Down" Gyro Drift Rate, $\Delta DR_{GD}$.

Note that plots Ⓒ thru Ⓕ are for a $\Delta DR_{GD}$ of 0.02 degrees/hour, for $\dot{L}_g=0$ and cos Lt=0.707 (illustrative example).

Ⓓ is the $\Delta\dot{\phi}$ error caused by a "Down" Gyro Drift Rate, $\Delta DR_{GD}$.

Ⓔ is the $\Delta V_{NS}$ error caused by a "Down" Gyro Drift Rate, $\Delta DR_{GD}$.

Ⓕ is the $\Delta Lt$ error caused by a "Down" Gyro Drift Rate, $\Delta DR_{GD}$.

Figure 5:
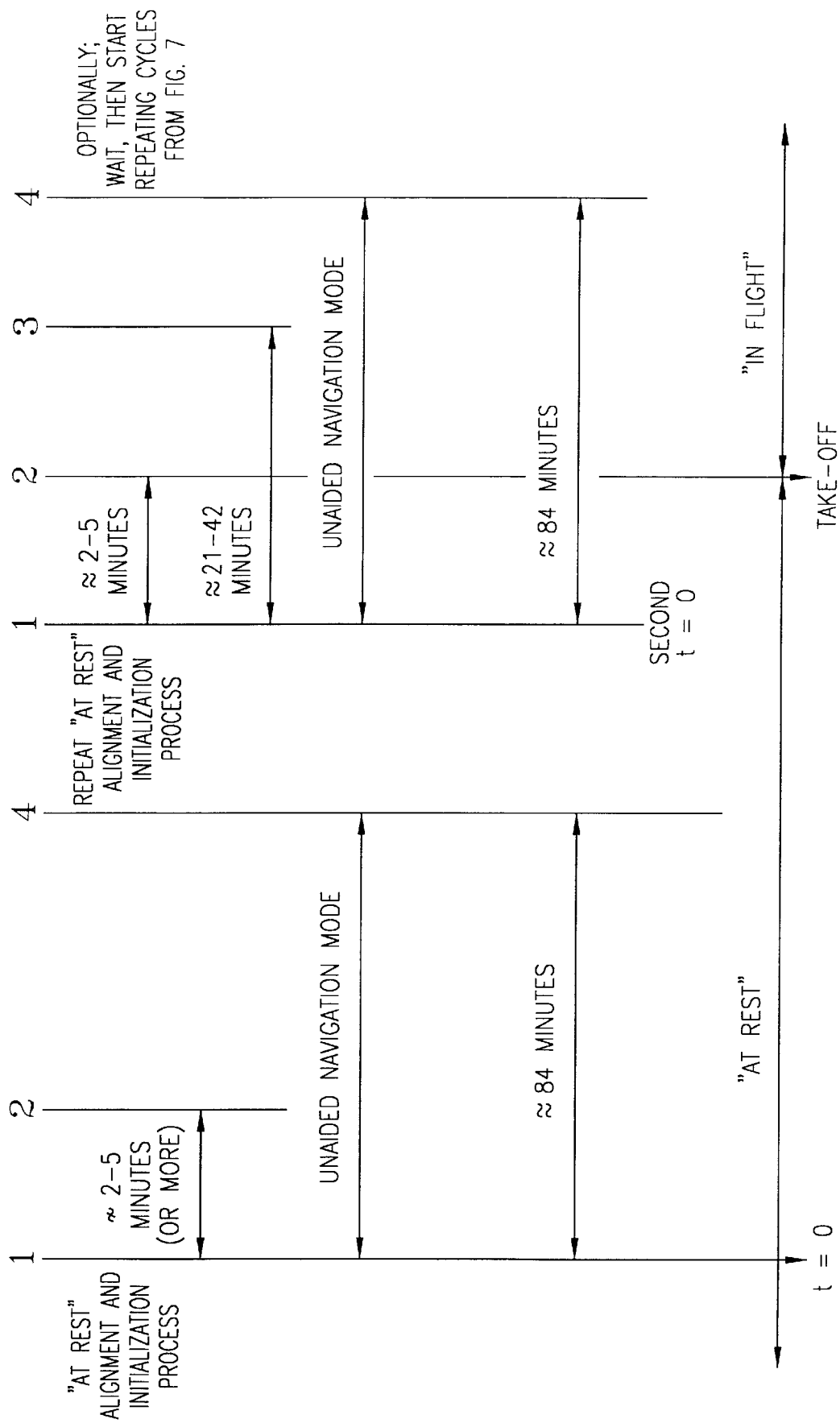

FIG. 5 illustrates the process of the present invention in a time-line fashion with the determination and correction for $\Delta DR_{GD}$ first occurring at point 4 with the system "at rest".

Figure 6:
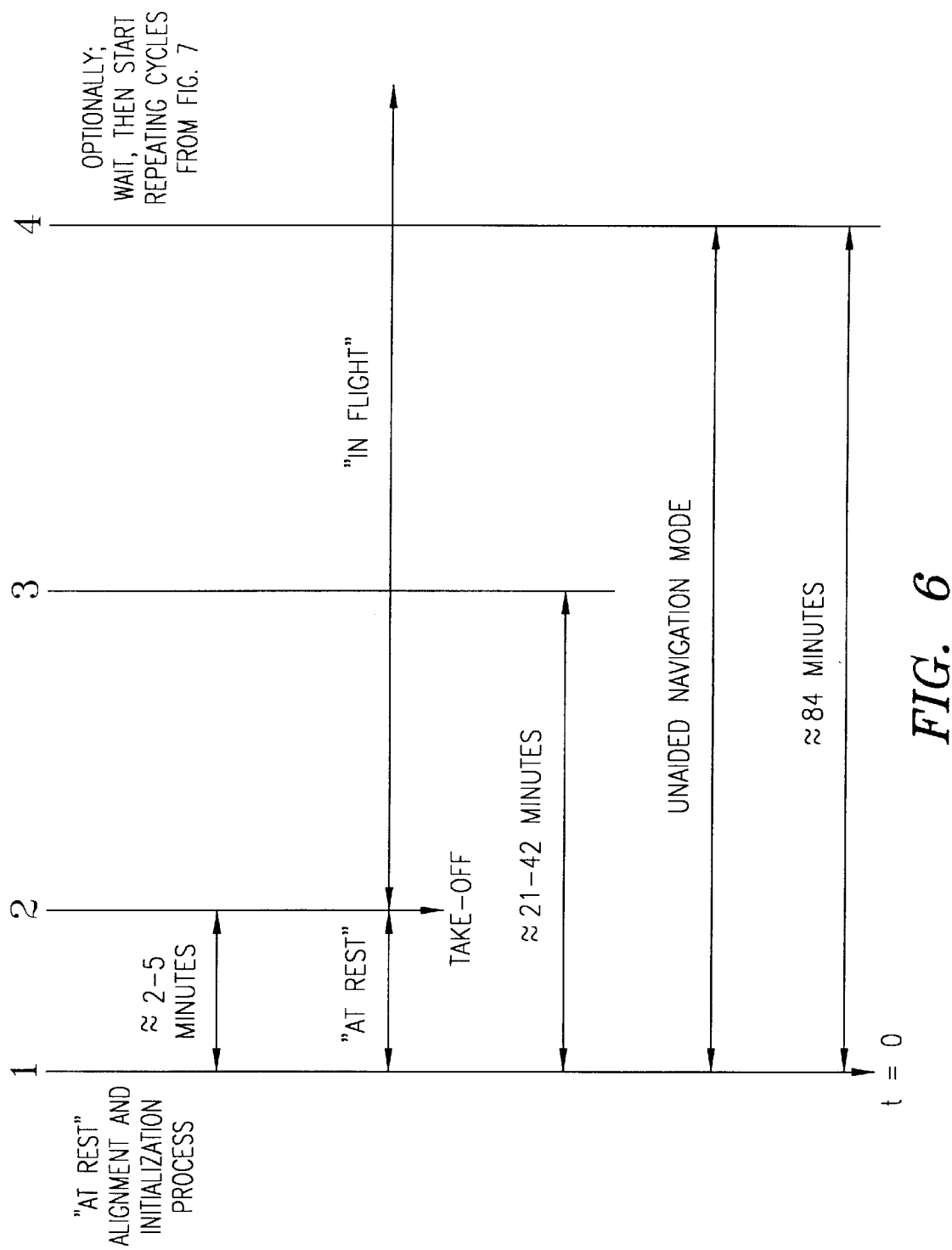

FIG. 6 illustrates the process of the present invention in a time-line fashion with the first determination and correction for $\Delta DR_{GD}$ occurring at point 4 with the system "in-flight".

Figure 7:
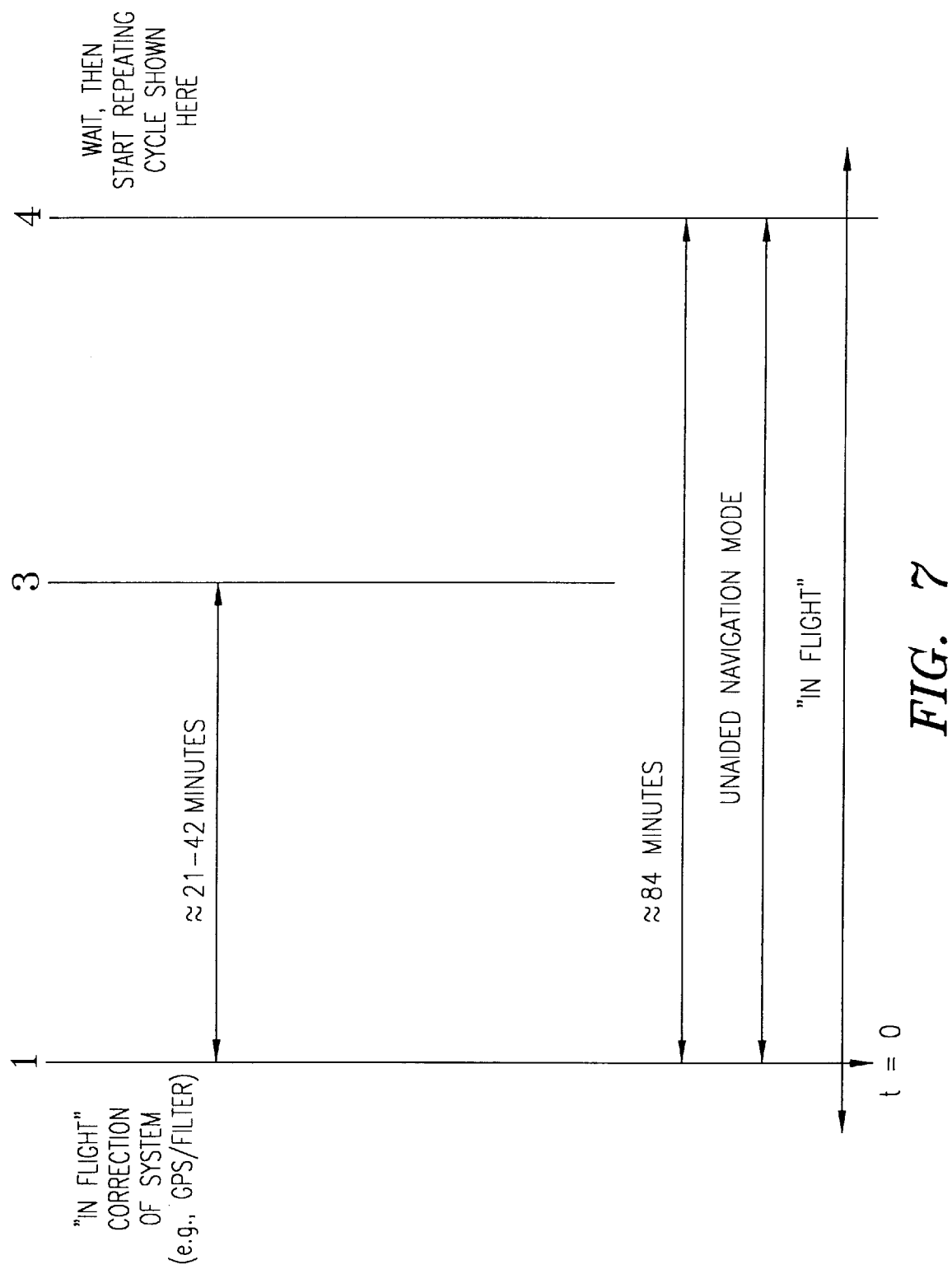

FIG. 7 illustrates the process of the present invention in a time-line fashion with subsequent determinations and corrections for $\Delta DR_{GD}$ (after the first) occurring at point 4 with the system "in-flight".

DETAILED DESCRIPTION

Figure 1:
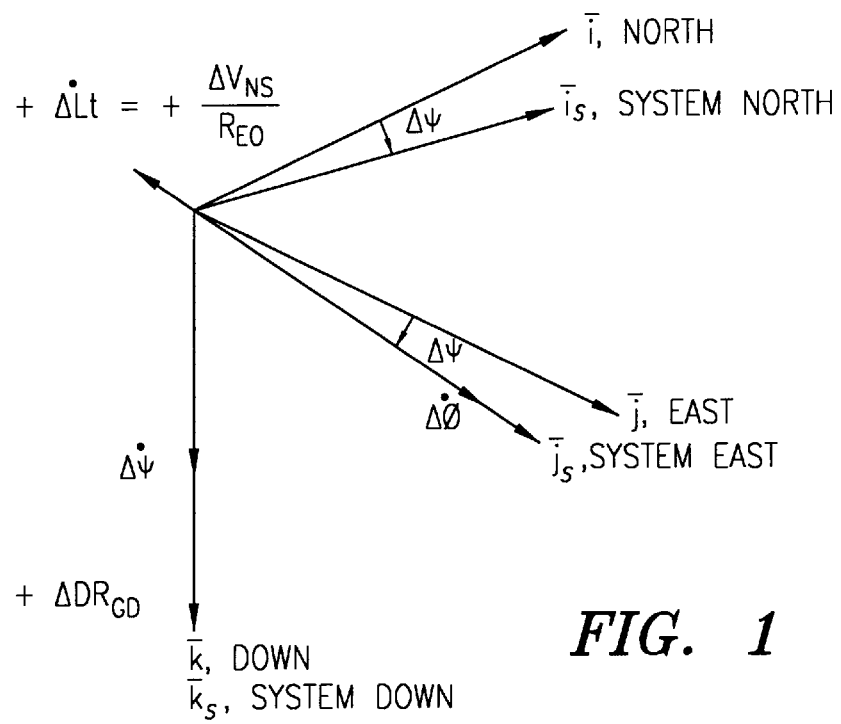
FIG. 1 shows the correct geographical orthogonal coordinate axes
$\bar{i}\bar{j},\bar{k}$
with $\bar{i}$ North, $\bar{j}$ East and $\bar{k}$ Down; and the misaligned system orthogonal coordinate axes
$\bar{i}_s, \bar{j}_s, \bar{k}_s$
separated by a pure and singular azimuth error, $\Delta\Psi$. $\Delta\Psi$ is a rotation about the $\bar{k}_s$ axis.

FIG. 1 shows the system with an azimuth-axis drift rate, $\Delta DR_{GD}$, which gives rise to an azimuth-axis drift rate $\Delta\dot{\Psi}$ and an azimuth angular error, $\Delta\Psi$. FIG. 1 shows the positive directions of $\Delta\dot{\phi}$ and $\Delta\dot{Lt}=\Delta V_{NS}/R_{EO}$.

Figure 2:
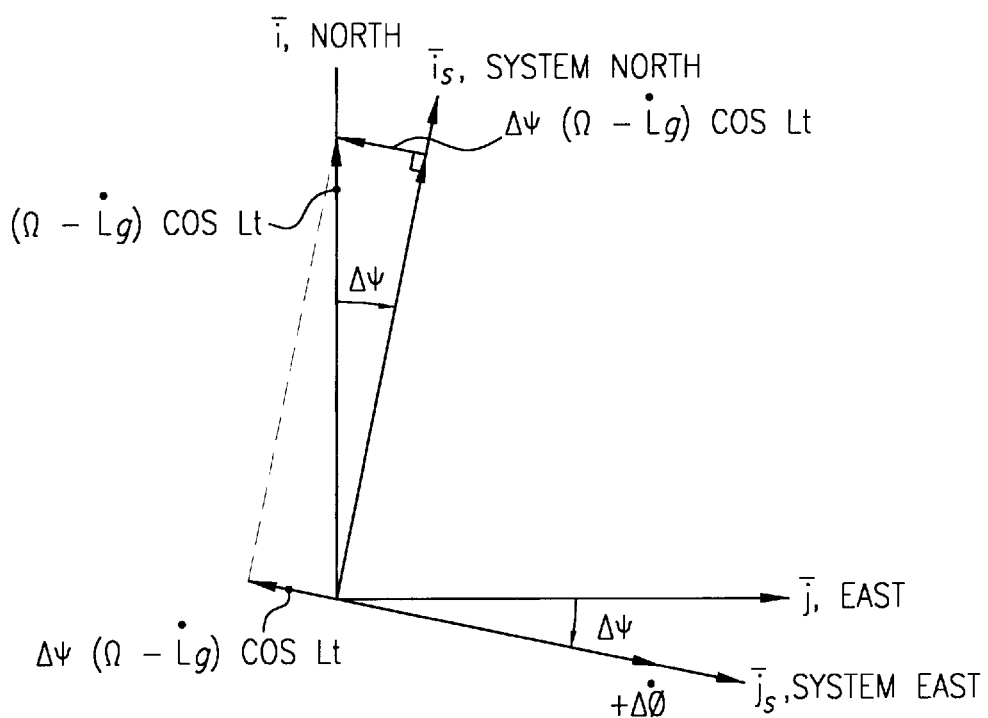
FIG. 2 shows the coupling of the "North" axis component of angular velocity of the system in inertial space, $(\Omega-\dot{L}_g) \cos Lt$, into the system "East" axis due to an azimuth error, $\Delta\Psi$, where
$\Delta\dot{\phi}=-\Delta\Psi(\Omega-\dot{L}_g) \cos Lt$.

FIG. 2 shows the system misaligned in azimuth by an angle $\Delta\Psi$, which gives rise to a system "East" axis angular rate error $\Delta\dot{\phi}$ due to the coupling $\Delta\dot{\phi}=-\Delta\Psi(\Omega-\dot{L}_g) \cos Lt$. Where $(\Omega-\dot{L}_g) \cos Lt$ is the "North" component of the angular rate of the system with respect to inertial space.

Figure 3:
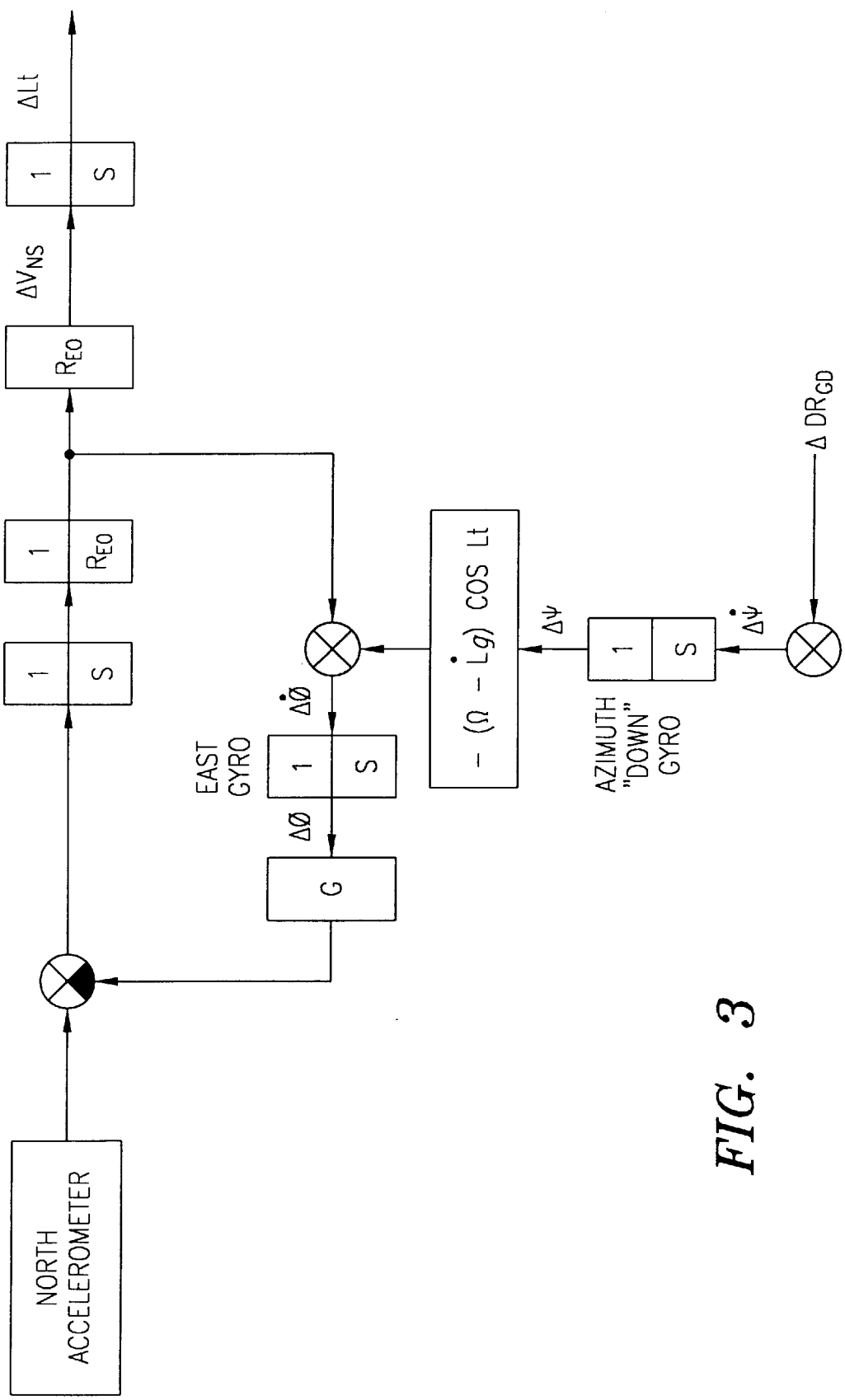
FIG. 3 is a model of the inertial navigator showing the coupling of the "Down" Gyro Drift Rate, $\Delta DR_{GD}$, with the "North" Velocity/Latitude loop of the system.
Figure 4A:
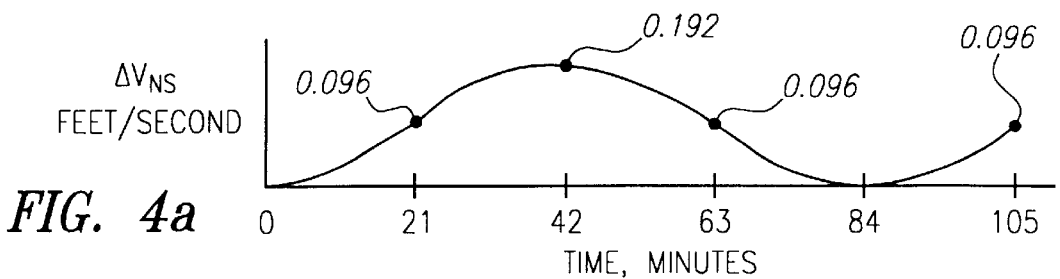
FIG. 4 shows the time plots of system errors as follows.
Figure 4B:
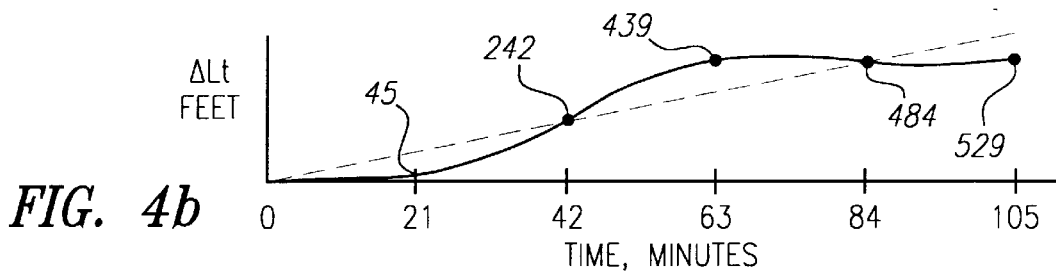
Figure 4C:
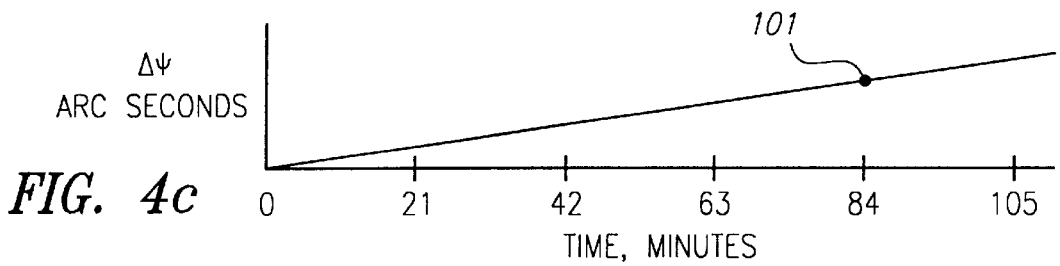
Figure 4D:
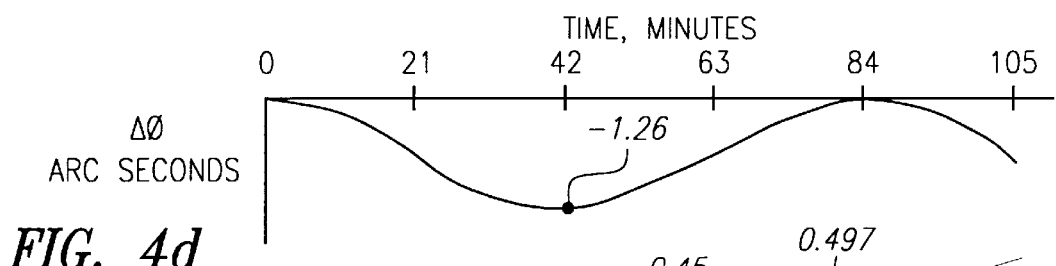
Figure 4E:
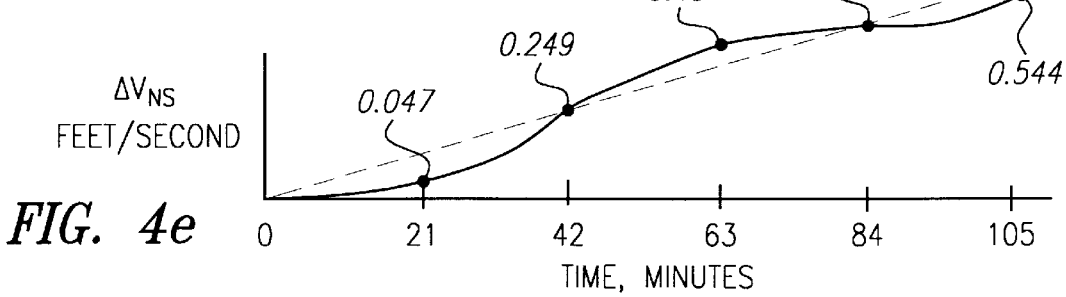
Figure 4F:
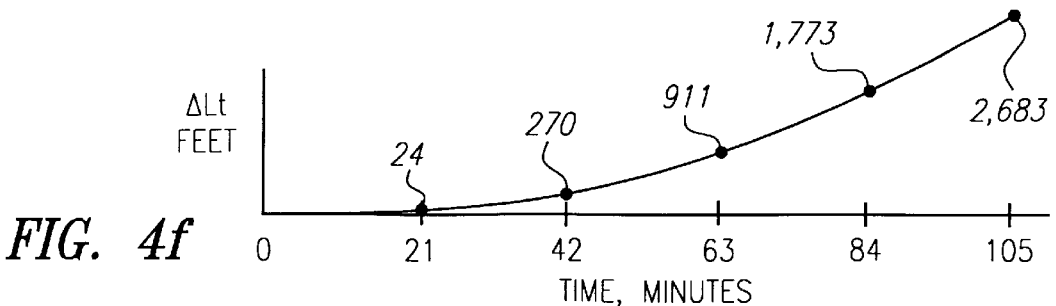

FIG. 3 is the model of the system showing the coupling of the azimuth axis with the "North" Velocity/Latitude loop of the system.

Referring to FIG. 4, it is noted that the $\Delta Lt$ error due to a $\Delta DR_{GD}$ error of 0.02 degrees/hour, plot Ⓕ, is observable against a $\Delta Lt$ error due to a $\Delta DR_{GE}$ error of 0.001 degrees/hour, plot Ⓑ, only towards the end of the first complete. Shuler (84-minute) period, and beyond. Therefore, we can determine $\Delta DR_{GD}$ at the end of the first Shuler period $(t=T_S=84$ minutes) from the following algorithm:

$$\Delta DR_{GD} = \frac{2\Delta Lt}{(\Omega - \dot{L}g)\cos Lt R_{EO}T_S^2}$$

Alternately, the more general algorithm may be utilized to determine $\Delta DR_{GD}$ for $t \neq T_S$.

$$\Delta DR_{GD} = \frac{\Delta Lt}{(\Omega - \dot{L}g)\cos Lt R_{EO}\left[t^2/2 - \frac{R_{EO}}{G} + \frac{R_{EO}}{G}\cos\sqrt{\frac{G}{R_{EO}}}\,t\right]}$$

The plots show that it is better to have t equal to more than $t=T_S=84$ minutes, if a position fix is utilized, as the value of $\Delta Lt$ due to $\Delta DR_{GD}$ increases significantly more than the value of $\Delta Lt$ due to $\Delta DR_{GG}$, which makes the determination of $\Delta DR_{GD}$ more observable.

$\Delta Lt$ at time t is derived "in-flight" from an external navigation aid fix of sufficient accuracy relative to the $\Delta Lt$ error. With the system "at rest", $\Delta Lt$ can be known precisely.

From FIG. 4, it should be noted that the $\Delta V_{NS}$ error due to a $\Delta DR_{GD}$ error of 0.02 degrees/hour, plot Ⓔ, is observable against a $\Delta V_{NS}$ error due to a $\Delta DR_{GE}$ error of 0.001 degrees/hour, plot Ⓐ, at the end of the first Shuler (84-minute) period. We can determine $\Delta DR_{GD}$ at the end of the first Shuler period $(t=T_S=84$ minutes) from the following algorithm:

$$\Delta DR_{GD} = \frac{\Delta V_{NS}}{(\Omega - \dot{L}g)\cos Lt R_{EO}T_S}$$

Where $\Delta V_{NS}$ at time $T_S$ is derived from an "in-flight" external navigation aid fix of sufficient accuracy relative to the $\Delta V_{NS}$ error. With the system "at rests", $\Delta V_{NS}$ can be known precisely.

The correct algorithm for $t \neq T_S$ is as follows:

$$\Delta DR_{GD} = \frac{\Delta V_{NS}}{(\Omega - \dot{L}g)\cos L t R_{EO}\left(t - \sqrt{\frac{R_{EO}}{G}}\sin\sqrt{\frac{G}{R_{EO}}}t\right)}$$

If $\Delta V_{NS}$ is monitored by an external navigation aid velocity fix, it is best to make the fix near $t=T_S=84$ minutes, because the $\Delta V_{NS}$ error due to an $\Delta DR_{GE}$ error is zero at $t=T_S$, refer to plot Ⓐ. The situation to be considered here is the accuracy of the $\Delta V_{NS}$ fix.

Note that $\Delta DR_{GD}$ may be determined from a monitored $\Delta Lt$ and/or a monitored $\Delta V_{NS}$. The choice is the accuracy of the fix as it effects the accuracy of determining $\Delta DR_{GD}$.

Once the $\Delta DR_{GD}$ is determined, the system is corrected for $\Delta DR_{GD}$ and the errors caused by $\Delta DR_{GD}$ (i.e., $\Delta\Psi$, $\Delta\phi$, $\Delta V_{NS}$ and $\Delta Lt$) and the system continues to navigate accurately, now devoid of the $\Delta DR_{GD}$ error and the errors caused by the $\Delta DR_{GD}$ error.

The above is the essence of the present invention.

We now turn our attention to the time-lines shove in FIG. 5, FIG. 6 and FIG. 7. In each of the figures, point 4 is where $\Delta Lt$ and/or $\Delta V_{NS}$ are monitored near the end of the first Shuler (84-minute) period in order to determine and correct for $\Delta DR_{GD}$ and the errors caused by $\Delta DR_{GD}$ as described in the present invention.

Point 3 is where the cross-axis position and/or velocity errors of invention (U.S. Pat. No. 5,789,671) are monitored to determine and correct for azimuth misalignment, $\Psi$, the $DR_{GE}$ which caused the $\Psi$ error and the cross-axis position and velocity errors caused by $\Psi$.

Point 2 is where the $\Delta V_{NS}$ and $\Delta V_{ES}$ of invention (U.S. Pat. No. 5,789,671) are monitored to determine and correct for $\Delta DR_{GE}$ and $\Delta DR_{GN}$ and the errors caused by $\Delta DR_{GE}$ and $\Delta DR_{GN}$ ($\Delta V_{NS}$ and $\Delta V_{ES}$, respectively). If deemed necessary, the drift angles and the position errors caused by $\Delta DR_{GE}$ and $\Delta DR_{GN}$ may also be corrected.

Point 1 is where the system is switched from the "At Rest" Alignment and Initialization Process (FIG. 5 and FIG. 6) or the "In-Flight" Correction of the System (FIG. 7) to the unaided navigate mode and corresponds to t=0.

The waiting "at rest" for the completion of the first Shuler period before Take-Off (FIG. 5) should be tolerable for airliners who necessarily spend time on the ground and have scheduled departures. The process presented in FIG. 5 can be started before scheduled departure while the airliner is being unloaded and reloaded with passengers. FIG. 6 is an option without this waiting "at rest" for the completion of the first Shuler period before Take-Off.

For the "In-Flight" case (refer to FIG. 6), the present invention may be combined with invention (U.S. Pat. No. 5,789,671) with the system continuing in the (unaided) navigate mode to correct for azimuth misalignment at point 3, as presented therein; and and to correct for azimuth-axis drift rate at point 4, as described herein.

It is stressed that the present invention is most effective at point 4 when prior to point 3 (say at point 2, per invention (U.S. Pat. No. 5,789,671), the "East" Gyro Drift Rate, $\Delta DR_{GE}$, has been corrected to a low value and when $\Delta DR_{GD}$ has a comparatively large value needing correction and observable at point 4. This is the condition illustrated at point 4 in FIG. 5, FIG. 6 and FIG. 7 and why invention (U.S. Pat. No. 5,789,671) is included in the discussion herein. Note that the process of invention (U.S. Pat. No. 5,789,671) between points 1 and 2 occurs only with the system "at rest". Point 3 always occurs "in-flight". Point 4 can occur with the system "at rest" (FIG. 5) or with the system "in-flight" (FIG. 5, FIG. 6 and FIG. 7).

In FIG. 5, the process shown between point 4 and the second point 1 is included to obtain determinations and corrections of $\Delta DR_{GE}$ and $\Delta DR_{GN}$ (since the last determinations/corrections) at the second point 2, prior to Take-Off in order to allow a more accurate determination of azimuth misalignment at point 3 and a more accurate determination of azimuth-axis drift rate at point 4.

FIG. 7 is presented to define the optional repeat cycles noted in FIG. 5 and FIG. 6.

The prior technique utilizing external navigation aids (such as the Global Positioning System, GPS) and an optimal estimation filter to correct the system has the ability to correct for $\Delta DR_{GE}$ and $\Delta DR_{GN}$ errors. In FIG. 7, the "In-Flight" Correction of the System (e.g., GPS/Filter) is assumed to correct $\Delta DR_{GE}$ and $\Delta DR_{GN}$ to sufficient accuracy to allow invention (U.S. Pat. No. 5,789,671) to work at point 3 of FIG. 7 and to allow the present invention to work at point 4 of FIG. 7. Since FIG. 7 is an optional sequel to FIG. 5 or FIG. 6, the system benefits from the prior processes of FIG. 5 or FIG. 6 and allows the "In-Flight" Correction of the System of FIG. 7 to better correct $\Delta DR_{GE}$ and $DR_{GN}$ errors, Those skilled in the art can adjust the system model of the optimal estimation filter to more closely resemble the status of the system and thus achieve better estimates (and corrections) for $\Delta DR_{GE}$ and $\Delta DR_{GN}$. During long flights, the cycle of FIG. 7, starting with the "In-Flight" Correction of the System may be repeated as many times as the flight duration allows to repeat corrections at points 3 and 4.

In FIG. 5, FIG. 6 and FIG. 7, the statement "wait" signifies a time allowed to have the system drift rates change and the system errors to buildup so that the processes of FIG. 7 can correct the system for azimuth misalignment at point 3 and for azimuth-axis drift rate at point 4.

In FIG. 5, the Repeat "At Rest" Alignment and Initialization Process between points 4 and 1 can utilize the "Stored Heading" azimuth alignment technique of invention (U.S. Pat. No. 5,789,671) with the restrictions noted therein. That is, the system is not moved while "at rest" and the azimuth stability of the system/vehicle combination is adequate to allow the technique to work. Since the azimuth misalignment is subsequently corrected at point 3, the "Stored Heading" azimuth alignment need not be perfect. The advantage of "Stored Heading" azimuth alignment over gyrocompassing in this instance is that it takes less time.

In FIG. 5, the time between the first points 1–2 can be extended say up to 21 minutes, more or less, since the system is going to stay "at rest" in the unaided navigate mode for approximately 84 minutes anyway. This extension allows more accurate determination of $\Delta DR_{GE}$ and $\Delta DR_{GN}$ errors.

The present invention, together with invention (U.S. Pat. No. 5,789,671) provides for determination and correction of the following error sources:

"East" and "North" Gyro Drift Rates

"Down" Gyro Drift Rate

Azimuth Misalignment

By correcting "Down" Gyro Drift Rate and azimuth misalignment, the above effectively uncouples the longitudinal (azimuth) axis of the system from the lateral (North and East) axes of the system and thus gets rid of the Foucault (24-hour) pendulum effect which is difficult to model. The result is improved directional accuracy and improved navigation performance.

We now turn our attention to the assumption that was made that requires validation. The assumption was that the quantity $(\Omega-\dot{L}_g) \cos Lt\ R_{EO}$ was constant. If the system is "at rest" on the ground, this assumption is valid. If the system is "in-flight", the assumption is valid if the system flies along a Latitude small circle (constant Latitude and constant $\dot{L}_g$) at constant altitude (constant $R_{EO}$). A second "in-flight" technique is to utilize the system model of FIG. 3 and create the functions $(\Omega-\dot{L}_g) \cos Lt$ and $R_{EO}$ from the system outputs. A "test" value of "$\Delta DR_{GD}$" can then be utilized to calculate "$\Delta V_{NS}$" and "$\Delta Lt$" at time t utilizing the system model of FIG. 3. When actual values of $\Delta V_{NS}$ and/or $\Delta Lt$ are monitored at time t, they can be compared to the "test" values, and the true value of $\Delta DR_{GD}$ can be derived as follows:

For "$\Delta DR_{GD}$" "test" value, we obtain "test" values "$\Delta V_{NS}$" and "$\Delta Lt$" at time t.

We obtain actual values $\Delta V_{NS}$ and $\Delta Lt$ at time t.

Then, the actual $\Delta DR_{GD}$ is given by $$\Delta DR_{GD} = \frac{\Delta V_{NS}}{\text{``}\Delta V_{NS}\text{''}} \text{``}\Delta DR_{GD}\text{''}$$

Or, $$\Delta DR_{GD} = \frac{\Delta Lt}{\text{``}\Delta Lt\text{''}} \text{``}\Delta DR_{GD}\text{''}$$

Those skilled in the art can implement other obvious techniques.

Note that if invention (U.S. Pat. No. 5,789,671) is to be utilized to correct for azimuth misalignment at point 3, then only the cross-axis position and velocity error corrections are to be made, leaving any $\Delta V_{NS}$ and $\Delta Lt$ errors due to $\Delta DR_{GD}$ to continue to buildup to point 4 where the azimuth-axis drift rate is to be determined and corrected.

Those skilled in the art can select the value of time for the events noted that best suits their system based, for example, on the grad of gyros utilized in their system. Also, those skilled in the art can select whether to monitor $\Delta V_{NS}$ or $\Delta Lt$, or both, and which algorithms to use to determine $\Delta DR_{GD}$ and the corrections for the system errors caused by $\Delta DR_{GD}$. Those skilled in the art can select whether to use the process and algorithms per FIG. 5 or FIG. 6 and whether to utilize the options noted therein.

Those skilled in the art can incorporate the present invention into the particular implementation of their inertial navigator. The process and algorithms of the present invention apply to gimballed and strapdown systems; and to local vertical, local North and all other analytic systems, such as geocentric vertical, space-stabilized azimuth systems. Also, the process and algorithms of the present invention apply to optimal estimation filters wherein their implementation achieves the intended purpose by incorporation of the process and algorithms into the filter's system model. The process and algorithms of the present invention may be implemented as an automatic sequence within the system computer to correct the system.

I claim:

1. A method for correcting an azimuth axis angular drift rate in an inertial navigator, comprising the steps of:

initializing the inertial navigator while at rest;

placing the inertial navigator in an unaided navigation mode;

measuring navigational parameters after a time interval T, said time interval T of a duration long enough to allow an error in latitude or north velocity due to azimuth-axis angular drift rate to become observable;

determining an azimuth-axis angular drift rate based upon said error; and correcting the inertial navigator for the azimuth-axis angular drift rate and for inertial navigator errors caused by the azimuth-axis angular drift rate, wherein said step of determining an azimuth-axis angular drift rate based upon said error is accomplished according to the formula $$\Delta DR_{GD} = \frac{\Delta Lt}{(\Omega - \dot{L}g)(\cos Lt) \cdot R_{EO}(t^2/2 - R_{EO}/G + R_{EO}/G\cos((G/R_{EO})^{1/2}t))}$$

if said error comprises a latitude error, or $$\Delta DR_{GD} = \frac{\Delta V_{NS}}{(\Omega - \dot{L}g)(\cos Lt) \cdot R_{EO}(t - (R_{EO}/G)^{1/2}\sin((G/R_{EO})^{1/2}t))}$$

if said error comprises a north velocity error, wherein $\Delta DR_{GD}$ represents the azimuth-axis angular drift rate, Lt represents a latitudinal position of the inertial navigator, $\Delta Lt$ represents the latitude error, $\Delta V_{NS}$ represents the north velocity error, Lg represents a longitude rate, $\Omega$ represents the Earth's angular rate in inertial space, $R_{EO}$ represents a distance from the center of the Earth to the inertial navigator, t represents the time interval T, and G represents a gravitational force.

2. The method of claim 1, wherein said step of correcting the inertial navigator for the azimuth-axis angular drift rate and for the inertial navigator errors caused by the azimuth-axis angular drift rate comprises the step of correcting the inertial navigator for an azimuth-axis angular error, a north level-axis angular error with respect to the horizontal, a north velocity error, and a latitude error.

3. The method of claim 2, wherein said step of correcting the inertial navigator for an azimuth-axis angular error, a north level-axis angular error with respect to the horizontal, a north velocity error, and a latitude error is accomplished according to the formulas $$\Delta\Psi = \Delta DR_{GD} \cdot t,$$

$$\Delta\phi = -\Delta DR_{GD} \cdot (\Omega - \dot{L}g) \cdot (\cos Lt) \cdot (R_{EO}/G)(1 - \cos((G/R_{EO})^{1/2}t)),$$

$$\Delta V_{NS} = \Delta DR_{GD} \cdot (\Omega - \dot{L}g) \cdot (\cos Lt) \cdot (R_{EO}) \cdot (t - (R_{EO}/G)^{1/2}t)), \text{ and}$$

$$\Delta Lt = \Delta DR_{GD} \cdot (\Omega - \dot{L}g) \cdot (\cos Lt) \cdot (R_{EO}) \cdot (t^2/2 - (R_{EO}/G) + (R_{EO}/G) \cdot \cos((G/R_{EO})^{1/2}t)),$$

wherein $\Delta\Psi$ represents the azimuth-axis angular error, $\Delta\phi$ represents the north level-axis angular error with respect to the horizontal, $\Delta V_{NS}$ represents the north velocity error, $\Delta Lt$ represents the latitude error, $\Delta DR_{GD}$ represents the azimuth-axis angular drift rate, Lt represents a latitudinal position of the inertial navigator, $\dot{L}g$ represents a longitude rate, $\Omega$ represents the Earth's angular rate in inertial space, $R_{EO}$ represents a distance from the center of the Earth to the inertial navigator, t represents the time interval T, and G represents a gravitational force.

4. The method of claim 1 wherein said time interval T comprises about one Shuler period.

5. The method of claim 4, wherein said error comprises a latitude error, and said step of determining an azimuth-axis angular drift rate based upon said error is accomplished according to the formula $$\Delta DR_{GD} = \frac{2 \cdot \Delta Lt}{(\Omega - \dot{L}g)(\cos Lt) \cdot R_{EO} \cdot T^2}$$

wherein $\Delta DR_{GD}$ represents the azimuth-axis angular drift rate, Lt represents a latitudinal position of the inertial navigator, $\Delta Lt$ represents the latitude error, Lg represents a longitude rate, $\Omega$ represents the Earth's angular rate in inertial space, $R_{EO}$ represents a distance from the center of the Earth to the inertial navigator, and G represents the value of gravity.

6. The method of claim 4, wherein said error comprises a north velocity error, and said step of determining an azimuth-axis angular drift rate based upon said error is accomplished according to the formula $$\Delta DR_{GD} = \frac{\Delta V_{NS}}{(\Omega - \dot{L}g) \cdot (\cos Lt) \cdot R_{EO} \cdot T}$$

wherein $\Delta DR_{GD}$ represents the azimuth-axis angular drift rate, Lt represents a latitudinal position of the inertial navigator, $\Delta V_{NS}$ represents the north velocity error, Lg represents a longitude rate, $\Omega$ represents the Earth's angular rate in inertial space, $R_{EO}$ represents a distance from the center of the Earth to the inertial navigator, and G represents the value of gravity.

7. The method of claim 4, wherein said step of correcting the inertial navigator for the azimuth-axis angular drift rate and for the inertial navigator errors caused by the azimuth-axis angular drift rate comprises the step of correcting the inertial navigator for an azimuth-axis angular error, a north velocity error, and a latitude error.

8. The method of claim 7, wherein said step of correcting the inertial navigator for an azimuth-axis angular error, a north velocity error, and a latitude error is accomplished according to the formulas $$\Delta \Psi = \Delta DR_{GD} \cdot T,$$

$$\Delta V_{NS} \Delta DR_{GD} \cdot (\Omega - \dot{L}g) \cdot (\cos Lt) \cdot R_{EO} \cdot T, \text{ and}$$

$$\Delta Lt = \frac{1}{2} \cdot \Delta DR_{GD} \cdot (\Omega - \dot{L}g) \cdot (\cos Lt) \cdot R_{EO} \cdot T^2,$$

wherein $\Delta \Psi$ represents the azimuth-axis angular error, $\Delta V_{NS}$ represents the north velocity error, $\Delta Lt$ represents the latitude error, $\Delta DR_{GD}$ represents the azimuth-axis angular drift rate, Lt represents a latitudinal position of the inertial navigator, $\dot{L}g$ represents a longitude rate, $\Omega$ represents the Earth's angular rate in inertial space, $R_{EO}$ represents a distance from the center of the Earth to the inertial navigator, and G represents the value of gravity.

9. The method of claim 1, wherein said steps of determining an azimuth-axis angular drift rate based upon said error and correcting the inertial navigator for the azimuth-axis angular drift rate and for inertial navigator errors caused by the azimuth-axis angular drift rate are carried out using an automatic sequence within a system computer.

10. The method of claim 1, wherein said step of measuring navigational parameters after a time interval T comprises the step of obtaining a reference position from at least one external navigation aid.

11. The method of claim 10, wherein said at least one external navigation aid comprises a global positioning system (GPS).

12. The method of claim 1, further comprising the steps of:

estimating functions $(\Omega - \dot{L}g) \cdot \cos Lt$ and $R_{EO}$ from a system model, wherein $\Omega$ represents the Earth's angular rate in inertial space, $\dot{L}g$ represents a longitudinal rate, Lt represents a latitudinal position of the inertial navigator, and $R_{EO}$ represents a distance from the center of the Earth to the inertial navigator;

selecting a test value for the azimuth-axis angular drift rate;

deriving an estimated north velocity error or latitude error based upon said test value for the azimuth-axis angular drift rate; and calculating an actual azimuth-axis angular drift rate based upon said estimated north velocity error or latitude error and the north velocity error or latitude error obtained by the step of measuring said navigational parameters.

13. The method of claim 12, wherein said step of calculating the actual azimuth-axis angular drift rate based upon said estimated north velocity error or latitude error and the north velocity error or latitude error obtained by the step of measuring said navigational parameters is accomplished according either one of the formulas $$\Delta DR_{GD} = (\Delta V_{NS} / \Delta V_{NS}') \cdot \Delta DR_{GD}'$$

or $$\Delta DR_{GD} = (\Delta Lt / \Delta Lt') \cdot \Delta DR_{GD}',$$

wherein $\Delta DR_{GD}$ represents the azimuth-axis angular drift rate, $\Delta V_{NS}$ represents the north velocity error, $\Delta V_{NS}'$ represents the estimated north velocity error, $\Delta DR_{GD}'$ represents the estimated azimuth-axis angular drift rate, $\Delta Lt$ represents the latitude error, and $\Delta Lt'$ represents the estimated latitude error.

14. The method of claim 1, wherein said steps of measuring navigational parameters, determining an azimuth-axis angular drift rate based upon said error, and correcting the inertial navigator for the azimuth-axis angular drift rate and for inertial navigator errors caused by the azimuth-axis angular drift rate, are repeated so as to periodically correct the inertial navigator for the azimuth-axis angular drift rate and for inertial navigator errors caused by the azimuth-axis angular drift rate.

15. A method for correcting an azimuth axis angular drift rate in an inertial navigator, comprising the steps of:

initializing the inertial navigator while at rest, placing the inertial navigator in an unaided navigation mode, measuring navigational parameters after a time interval T, said time interval T of a duration long enough to allow an error in latitude or north velocity due to azimuth-axis angular drift rate to become observable, determining an azimuth-axis angular drift rate based upon said error;

correcting the inertial navigator for the azimuth-axis angular drift rate and for inertial navigator errors caused by the azimuth-axis angular drift rate;

measuring a north velocity error while the inertial navigator is at rest;

measuring an east velocity error while the inertial navigator is at rest;

determining drift rates about an east axis and a north axis;

correcting the inertial navigator for the drift rates about the east axis and the north axis;

correcting the inertial navigator for the east velocity error and the north velocity error;

determining cross-axis position and velocity errors in navigational data output by the inertial navigator after the inertial navigator has traveled from an original location to a new location, said cross-axis position and velocity errors caused at least in part by an initial azimuth misalignment;

correcting the inertial navigator for the cross-axis position and velocity errors;

determining initial azimuth misalignment from at least one of said cross-axis errors; and correcting the inertial navigator for an initial azimuth misalignment and an east gyro drift rate that caused the initial azimuth misalignment.

16. A method of navigating using an inertial navigator, comprising the steps of:

initializing the inertial navigator while at rest, said inertial navigator thereby being self-aligned in azimuth;

placing the inertial navigator in an unaided navigation mode;

measuring, during an at-rest measurement interval, a north velocity error while the inertial navigator is at rest;

measuring, during said at-rest measurement interval, an east velocity error while the inertial navigator is at rest;

determining drift rates about an east axis and a north axis;

correcting the inertial navigator for the drift rates about the east axis and the north axis;

correcting the inertial navigator for the north velocity error and the east velocity error;

placing the inertial navigator in motion;

determining cross-axis portion and velocity errors in navigational data output by the inertial navigator after the inertial navigator has traveled from an original location to a new location, said cross-axis position and velocity errors caused at least in part by an initial azimuth misalignment;

determining an initial azimuth misalignment and an east gyro drift rate from at least one of said cross-axis position and velocity errors;

correcting the inertial navigator for the cross-axis position and velocity errors;

correcting the inertial navigator for an initial azimuth misalignment and an east gyro drift rate that caused the initial azimuth misalignment;

measuring navigational parameters after a time interval T from placing the inertial navigator in the unaided navigation mode, said time interval T of a duration long enough to allow an error in latitude or north velocity due to azimuth-axis angular drift rate to become observable;

determining an azimuth-axis angular drift rate based upon said error;

correcting the inertial navigator for the azimuth-axis angular drift rate and for the inertial navigator errors caused by the azimuth-axis angular drift rate.

17. The method of claim 16, wherein said inertial navigator travels from said original location to said new location on a vehicle of flight.

18. The method of claim 16, wherein said time interval T comprises about one Schuler period.

19. The method of claim 16, wherein said step of correcting the inertial navigator for the azimuth-axis angular drift rate and for the inertial navigator errors caused by the azimuth-axis angular drift rate comprises the step of correcting the inertial navigator for an azimuth-axis angular error, a north level-axis angular error with respect to the horizontal, a north velocity error, and a latitude error.

* * * * *

UNITED STATES PATENT AND TRADEMARK OFFICE
CERTIFICATE OF CORRECTION

PATENT NO. : 5,941,935
DATED : August 24, 1999
INVENTOR(S) : Manuel Fernandez

It is certified that error appears in the above-identified patent and that said Letters Patent is hereby corrected as shown below:

At col. 2, line 31 the term "hag" should read --has--.

At col. 2, line 41 the symbol "$T_s$" should read --$T_s^2$--.

At col. 3, line 31 the symbol "$\overline{ij}$" should read --$\overline{i}, \overline{j}$--.

At col. 4, line 27 there should be no period after "complete".

At col. 4, line 47 the symbol "$\Delta DR_{GG}$" should read --$\Delta DR_{GE}$--.

At col. 4, line 66 the term "at rests"should read --"at rest"--.

At col. 5, line 22, the term "shove" should read --shown--.

At col. 5, line 59 the term "(U.S. Pat. No. 5,789,671)" should read --(U.S. Pat. No. 5,789,671))--.

At col. 7, line 39 the term "grad" should read --grade--.

At col. 8, line 26 the symbol "Lg" should read --$\dot{L}g$--.

UNITED STATES PATENT AND TRADEMARK OFFICE
CERTIFICATE OF CORRECTION

PATENT NO. : 5,941,935
DATED : August 24, 1999
INVENTOR(S) : Manuel Fernandez

It is certified that error appears in the above-indentified patent and that said Letters Patent is hereby corrected as shown below:

At col. 8, line 47 the equation "$\Delta V_{NS} = \Delta DR_{GD} \cdot (\Omega - \dot{L}g) \cdot (\cos Lt) \cdot (R_{E0}) \cdot (t - (R_{E0}/G)^{1/2} t))$, and" should read
--$\Delta V_{NS} = \Delta DR_{GD} \cdot (\Omega - \dot{L}g) \cdot (\cos Lt) \cdot (R_{E0}) \cdot (t - (R_{E0}/G)^{1/2} \sin((G/R_{E0})^{1/2} t))$, and--.

At col. 9, line 7 the symbol "Lg" should read --$\dot{L}g$--.

At col. 9, line 23 the symbol "Lg" should read --$\dot{L}g$--.

At col. 9, line 40 the equation "$\Delta V_{NS} \Delta DR_{GD} \cdot (\Omega - \dot{L}g) \cdot (\cos Lt) \cdot R_{E0} \cdot T$, and" should read --$\Delta V_{NS} = \Delta DR_{GD} \cdot (\Omega - \dot{L}g) \cdot (\cos Lt) \cdot R_{E0} \cdot T$, and--.

At col. 9, line 41 the equation "$\Delta Lt = \tfrac{1}{2} \cdot \Delta DR_{GD} \cdot (\Omega - Lg) \cdot (\cos Lt) \cdot R_{E0} \cdot T^2$" should read --$\Delta Lt = \tfrac{1}{2} \cdot \Delta DR_{GD} \cdot (\Omega - \dot{L}g) \cdot (\cos Lt) \cdot R_{E0} \cdot T^2$--.

Signed and Sealed this

Twentieth Day of March, 2001

*Attest:*

NICHOLAS P. GODICI

*Attesting Officer*   *Acting Director of the United States Patent and Trademark Office*